United States Patent
Tolbert

[11] Patent Number: 5,925,581
[45] Date of Patent: Jul. 20, 1999

[54] TEXTILE LAMINATE

[75] Inventor: Thomas Warren Tolbert, Fort Mill, S.C.

[73] Assignee: Spring Industries, Inc., Fort Mill, S.C.

[21] Appl. No.: 08/732,529

[22] Filed: Oct. 15, 1996

Related U.S. Application Data

[62] Division of application No. 08/449,488, May 24, 1995, which is a division of application No. 08/113,381, Aug. 27, 1993, abandoned.

[51] Int. Cl.$^6$ ................................................. D03D 3/00
[52] U.S. Cl. ........................ 442/334; 428/903; 442/340; 442/346; 442/381
[58] Field of Search ............................. 442/62, 340, 373, 442/374, 382, 400, 401, 334, 381, 346; 428/903

[56] References Cited

U.S. PATENT DOCUMENTS

| | | | |
|---|---|---|---|
| Re. 33,023 | 8/1989 | Hiers . | |
| 3,338,992 | 8/1967 | Kinney | 264/24 |
| 3,341,394 | 9/1967 | Kinney | 161/72 |
| 3,849,241 | 11/1974 | Butin et al. | 161/169 |
| 3,956,560 | 5/1976 | Smith, II . | |
| 3,978,185 | 8/1976 | Buntin et al. | 264/93 |
| 3,993,518 | 11/1976 | Buck, Jr. et al. | 156/62.6 |
| 4,047,991 | 9/1977 | Buck, Jr. et al. | 156/62.6 |
| 4,050,977 | 9/1977 | Buck, Jr. et al. | 156/283 |
| 4,051,294 | 9/1977 | Buck, Jr. et al. | 428/283 |
| 4,053,673 | 10/1977 | Buck, Jr. et al. | 428/283 |
| 4,053,674 | 10/1977 | Buck, Jr. et al. | 428/283 |
| 4,196,245 | 4/1980 | Kitson et al. | 428/198 |
| 4,211,817 | 7/1980 | Buck, Jr. et al. | 428/310 |
| 4,239,792 | 12/1980 | Ludwa | 428/198 |
| 4,251,581 | 2/1981 | Schoppa et al. | 428/95 |
| 4,275,105 | 6/1981 | Boyd et al. | 428/198 |
| 4,355,066 | 10/1982 | Newman | 428/198 |
| 4,363,680 | 12/1982 | Buck, Jr. et al. | 156/62.6 |
| 4,457,793 | 7/1984 | Buck, Jr. | 156/62.6 |
| 4,473,428 | 9/1984 | Buck, Jr. et al. | 156/474 |
| 4,550,050 | 10/1985 | Buck, Jr. | 428/283 |
| 4,616,057 | 10/1986 | Lindemann et al. | 524/458 |
| 4,655,757 | 4/1987 | McFarland et al. | 604/366 |
| 4,657,802 | 4/1987 | Morman | 428/152 |
| 4,766,029 | 8/1988 | Brock et al. | 428/286 |
| 4,781,966 | 11/1988 | Taylor | 428/152 |
| 4,783,364 | 11/1988 | Ilan | 428/288 |
| 4,784,892 | 11/1988 | Storey et al. | 862/172 |
| 4,801,482 | 1/1989 | Goggans et al. | 428/68 |
| 4,810,571 | 3/1989 | Guthrie | 428/286 |
| 4,818,599 | 4/1989 | Marcus | 428/288 |
| 4,863,779 | 9/1989 | Daponte | 428/152 |
| 4,863,785 | 9/1989 | Berman et al. | 428/218 |
| 4,868,032 | 9/1989 | Eian et al. . | |
| 4,908,263 | 3/1990 | Reed et al. | 428/286 |
| 4,935,295 | 6/1990 | Serafini | 428/286 |
| 4,981,747 | 1/1991 | Morman | 428/198 |
| 5,066,538 | 11/1991 | Huykman | 428/288 |
| 5,087,487 | 2/1992 | Katz et al. | 427/366 |
| 5,102,711 | 4/1992 | Keller et al. | 428/71 |
| 5,104,725 | 4/1992 | Broaddus | 428/224 |
| 5,112,684 | 5/1992 | Halm et al. | 428/357 |
| 5,145,727 | 9/1992 | Potts et al. | 428/198 |
| 5,149,576 | 9/1992 | Potts et al. | 428/198 |
| 5,190,997 | 3/1993 | Lindemann et al. | 524/44 |

OTHER PUBLICATIONS

Wente, Van A., *Industrial and Engineering Chemistry*, Superfine Thermoplastic Fibers, vol. 48, No. 8, pp. 1342–1346, Aug. 1956.

*Primary Examiner*—James J. Bell
*Attorney, Agent, or Firm*—Bell Seltzer Intellectual Property Law Group of Alston & Bird LLP

[57] ABSTRACT

The present invention relates to a textile laminate comprising a fiberfill web substrate and a face layer. The fiberfill web substrate has a plurality of first fibers at the surface of the substrate. The face layer comprises a plurality of extruded second fibers which are mechanically intertangled with the plurality of first fibers at the surface of the substrate to thereby form the textile laminate. Typically, the first fibers of the fiberfill web are polyester fiberfill fibers and the second fibers of the extruded face layer are polypropylene fibers.

13 Claims, 3 Drawing Sheets

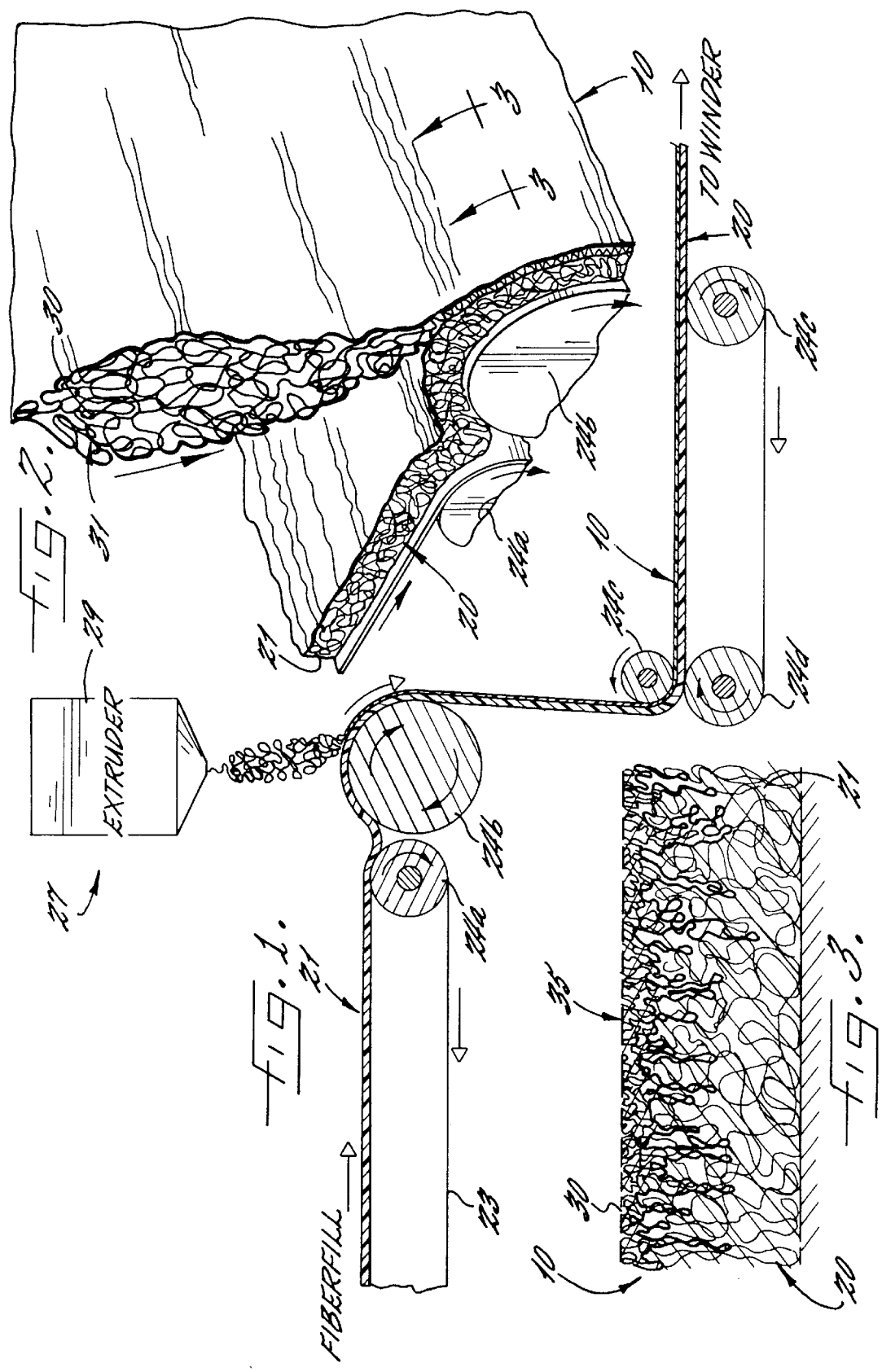

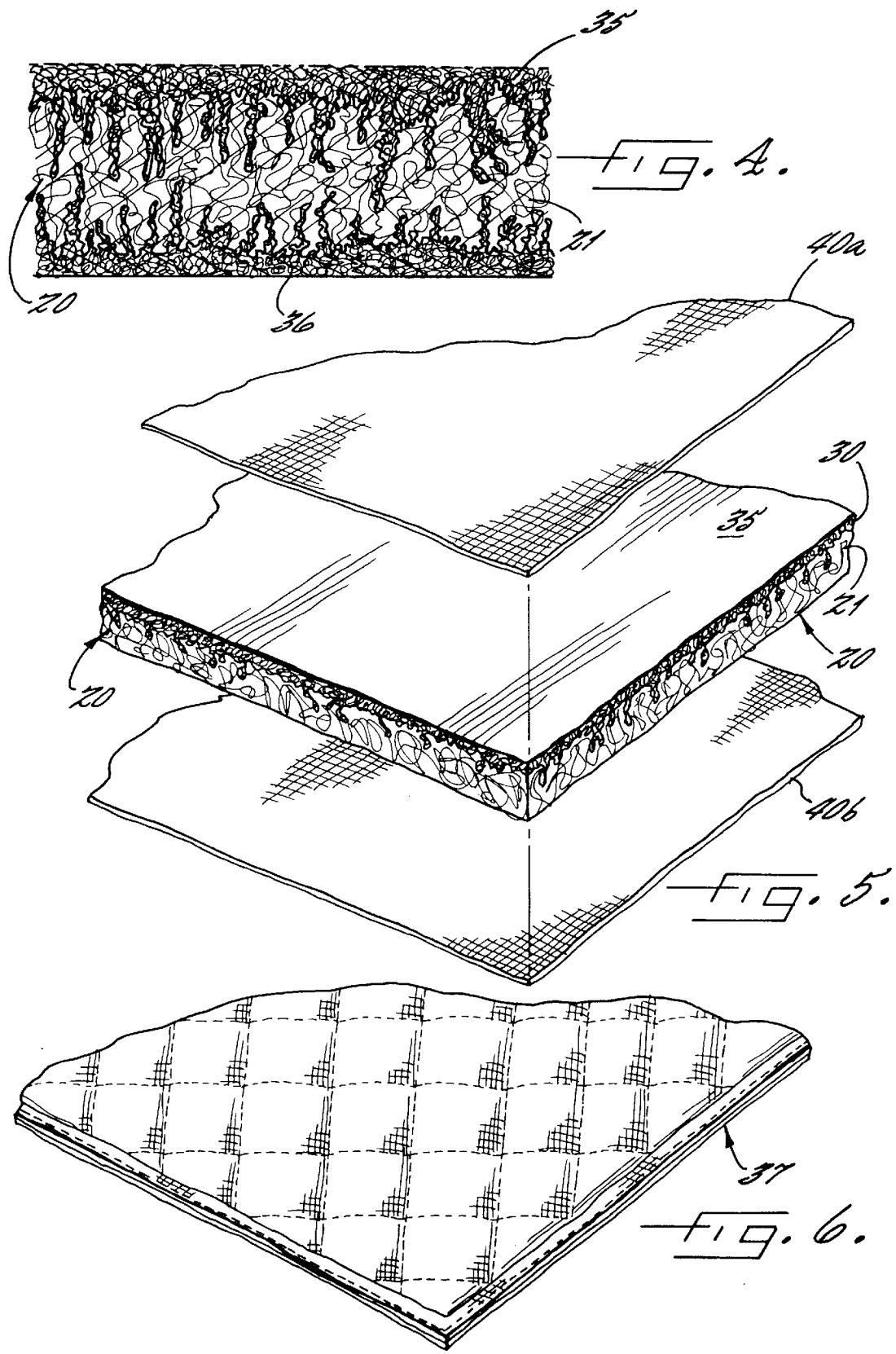

TEXTILE LAMINATE

This application is a divisional of pending application Ser. No. 08/449,488, filed May 24, 1995, which is a divisional of Ser. No. 08/113,381, filed Aug. 27, 1993, now abandoned, the disclosure of which is incorporated by reference herein in its entirety.

BACKGROUND OF THE INVENTION

The present invention relates to a textile laminate, and particularly to a textile laminate including fiberfill having improved material handling properties and aesthetic appeal. The present textile laminate can be used in bedding, apparel, packaging, building materials and the like.

Fiberfill is a generic term used to describe a variety of nonwoven fabrics for a variety of end uses characterized by the loft and thickness of the fabric. Loft is an important characteristic inasmuch as it provides insulation in bed quilting and comforters, cushioning in pillows and furniture battings, and dust holding properties in filter media. Fiberfill is typically a web of 1 to 30 denier polyester fibers formed using various techniques such as cross-lapping or air laying. One of the problems with fiberfill is that it is difficult to handle particularly when transferred after formation and prior to making the article being manufactured. If the fiberfill is rolled up, it is often difficult to unroll the fiberfill for later use. For example, fibers that lack crimp (e.g., textile staple fiberglass) tend to form fiberfill that is especially sensitive to permanent deformation. Air-laid webs, wherein the preponderance of the individual fibers are oriented with their axes perpendicular to the plane of the web, are also susceptible to permanent deformation and separation.

Conventional thinking, as proposed in U.S. Pat. No. 5,190,997 to Lindemann et al., is that a polymer emulsion bonding agent is needed in that products not having the bonding agent tend to lack durability, tensile strength and resiliency. The use of a bonding agent, however, tends to decrease the aesthetics of the fiberfill in that articles such as pillows and comforters tend to have a somewhat "boardy" feel to the article.

It would highly desirable to provide a textile laminate using fiberfill which has the mechanical features comparable to bonded fiberfill yet is aesthetically appealing, and exhibits durability during handling.

SUMMARY OF THE INVENTION

The textile laminate of the present invention advantageously provides a laminate using fiberfill which is easy to handle and process, and has desirable aesthetic properties. The present invention relates to a textile laminate comprising a fiberfill web substrate and a face layer. The fiberfill web substrate has a plurality of first fibers at the surface of the substrate. The face layer comprises a plurality of extruded second fibers which are mechanically intertangled with the plurality of first fibers at the surface of the substrate to thereby form the textile laminate. Typically, the first fibers of the fiberfill web are polyester fiberfill fibers and the second fibers of the extruded face layer are polypropylene fibers. The second fibers tend to intermingle among themselves to comprise a web in their own right.

The mechanical intertanglement contributes to the laminate having improved material handling and aesthetic properties as compared to conventional fiberfill products. For example, the mechanical integrity of the laminate of the present invention permits the laminate to be rolled up and unrolled, to be vacuum packaged, and to support its own weight under tension such as encountered during drawing into conventional winding apparatus, and permits the laminate to be washed, or dry cleaned, and tumbled or otherwise buffeted in the manner of normal use of bedding, filtration media, industrial padding, insulation, and the like.

The present invention also provides a method for producing a flexible textile laminate. The method comprises forming a base layer of a fiberfill web having a plurality of first fibers. A face layer of extruded fibers is laid down on the base layer under conditions sufficient to mechanically interentangle the first fibers of the fiberfill web substrate and the second fibers of the face layer to provide the textile laminate without use of tertiary materials or secondary processes (e.g., melting or tack adhesion) to consolidate these component webs into a generally integral ensemble.

The textile substrate of the invention provides encapsulating properties of the face layer relative to the fiberfill web substrate, resilient bulk properties of the fiberfill web substrate and the increased tensile properties of the laminate which contribute to its improved material handling properties.

BRIEF DESCRIPTION OF THE DRAWINGS

Some of the objects and advantages of the present invention having been stated, others will appear as the description proceeds and be considered in conjunction with the accompanying drawings in which:

FIG. 1 is a diagrammatic and schematic representation of a method of producing a textile laminate in accordance with the invention;

FIG. 2 is an enlarged detailed isometric view of a portion of the formation of the textile laminate;

FIG. 3 is a cross-sectional view of the laminate taken along line 3—3 of FIG. 2 with the thickness of the face layer exaggerated;

FIG. 4 is a cross-sectional view of another embodiment of the textile laminate with the thickness of the face layers exaggerated;

FIG. 5 is an exploded detailed isometric view of the textile laminate used in a quilt;

FIG. 6 is an isometric view of the quilt of FIG. 5;

DETAILED DESCRIPTION OF THE INVENTION

Figure 7A:
FIG. 7A is a electron micrograph of the prior art.

The present invention now will be more described hereinafter with reference to the accompanying drawings, in which a preferred embodiment of the invention is shown. This invention can, however, be embodied in many different forms and should not be construed as limited to this embodiment set forth herein; rather, applicants provide disembodiment so that this disclosure will be thorough and complete, and will fully convey the scope of the invention to those skilled in the art.

The laminate of the present invention has two basic components, namely a fiberfill web substrate and at least one face layer. The fiberfill web substrate has a plurality of first fibers at the surface thereof. The fibers can be any fibers that can be formed and layed as a web. For example, the first fibers can be fibers of polyester, aromatic and aliphatic polyamides, polyolefins (e.g., polyethylene, polypropylene, polybutylene, etc.), polybenzimidazoles, polyphenylene sulfides, cellulose acetate, rayon, cotton, acrylics, cellulose, ramie, linen, wool, steel, nickel, glass, alone or in blends with each other or in blends with other material such as non-fibrous materials such as ground or chopped cellulose pulp, threads, cloth fragments, feathers, down, milkweed fiber, and other fillers.

Polyester fibers are particularly preferred and an exemplary commercially available fiber is DuPont Dacron® Hollofil™. The first fibers can be flock, short staple (e.g., 0.5 to 2 inches), chopped strand, staple (e.g., longer than 2 inches), tow, stretch broken filaments and combinations thereof. The first fibers typically have a linear density of about 1 to 30 denier per filament, sometimes about 3 to 25 denier per filament and often about 6 to 12 denier per filament depending on the intended use. For example, fiberfill for bedding often has a linear density of 6 to 12 denier per filament; fiberfill for apparel often has a linear density of 3 to 6 denier per filament; fiberfill for bedding pillows often has a linear density of 6 to 15 denier per filament; and fiberfill for filtration media often has a linear density of either 1 to 3 denier per filament or 15 to 30 denier per filament. The resulting fiberfill web substrate typically has a basis weight of about 1 to 10 oz/sq yd, sometimes about 3 to 8 oz/sq yd, and often about 4 to 6 oz/sq yd depending on the intended use. For example, for bedding the basis weight is often 3 to 10 oz/sq yd, and for apparel, the basis weight is often 1 to 4 oz/sq yd.

The face layer comprises a plurality of extruded second fibers. The fibers can be any fibers that can be extruded, namely, thermoplastic polymers. For example, the extruded second fibers can be fibers of polyesters, polyolefins (e.g., polyethylene polypropylene, polybutylene), polybutylene terephthalate, polyethylene terephthalate, aliphatic and aromatic polyamides, polyphenylene sulfides, alone or in blends with each other, or as copolymers thereof. The extruded second fibers typically have a fiber diameter of about 2 to 620 micrometer sometimes about 2 to 224 micrometer, and often about 2 to 28 micrometer depending on the intended use. The face layer typically has a basis weight of about 2 to 50 g/sq m sometimes about 4 to 20 g/sq m, and often about 5 to 7 g/sq m depending on the intended use.

Referring now more particularly to the drawings, the textile laminate of the present invention is indicated generally by the reference character 10. The formation of the textile laminate 10 is illustrated in FIGS. 1 and 2. A fiberfill substrate 20 is formed from first fibers 21 at an off-line or on-line formation station (not shown) using conventional techniques such as cross-lapped card web, in-line laid card web, corrugated card web, air laid web, needle tacked air laid web, sliver knit, flannel, brushed woven or knitted fabric, velour, flocked substrate, etc., the selection of which will be within the skill of one in the art. The fiberfill web substrate 20 is transported from the formation station using a continuous foraminous belt 23 mounted on rollers 24a, 24b, 24c, 24d, and 24e for movement to a fiber extrusion station 27. It is noted that the partially closed nip between rolls 24c and 24d contributes to the mechanical interentanglement. It is further noted that rolls 24a and 24b may comprise a single perforated cylinder, and that roll 24b may further comprise a source of negative air pressure whereby the second fibers 30 are drawn toward and into the fiberfill web substrate 20. Further, the continuous foraminous belt 23 may be threaded in a non-folded, planar manner such that rolls 24a, 24d, and 24e provide mechanical suspension only, while a source of negative air pressure, of equivalent functions as perforated cylinder roll 24b, is supplied by a transverse manifold or plenum, and the calibrating nip or working action between rolls 24c and 24d may be provided in a conventional manner. The fiber diameter for meltblown-spunbonded species 31 is very fine relative to the fiber diameter of the crosslapped card web (fiberfill web substrate). The extruded fibers also can comprise partially oriented filaments which are easily drafted by application of mechanical force such as would be supplied by the nip between rolls 24c and 24d.

At the fiber extrusion station 27, an extruder 29 extrudes the second fibers 30 as a fiber stream 31 to provide a face layer 35. The extruded fibers can be the fibers listed previously, and preferably are meltblown thermoplastic polymer microfibers of polypropylene, polyamides (e.g., nylon 6, nylon 6,6), polybutylene terephthalate, polyethylene, polyethylene terephthalate, linear low density polyethylene and copolymers and blends thereof. Typically meltblown fibers have a finer linear density of about 0.05 to 5 denier per filament. The extruded meltblown fibers are prepared using conventional techniques such as described in U.S. Pat. No. 3,978,185 Buntin et al., the disclosure of which is incorporated herein by reference in its entirety and *Industrial and Engineering Chemistry*, vol. 48, no. 8 (1965), pp. 1342–1356. Generally, the process involves extruding one of the thermoplastic fibers listed above through orifices (often about 34 orifices per linear inch) of a heated nozzle into a stream of hot gas or air preferably having a controlled density to attenuate the molten resin as fibers. The temperature of the hot gas or air is typically greater than ambient temperature but is less than the die temperature. Thus the fibers are quenched by the hot gas or air. A particularly preferred meltblown fiber is polypropylene such as Exxon Escorene 500 melt flow rate polypropylene available from Exxon Chemical Company, Houston, Tex.

The same thermoplastic fibers can also be extruded using spunbonding techniques such as described, for example, in U.S. Pat. Nos. 3,338,992 and 3,341,394 to Kinney, the disclosures of which are incorporated herein by reference in their entirety. Generally, the spunbonding process involves continuously extruding one of the thermoplastic fibers through a spinneret to form discrete filaments. The filaments are drawn to achieve molecular orientation and tenacity. Typically, spunbonded fibers have a coarser linear density of about 1 to 20 denier per filament. A skilled artisan will recognize that other extrusion techniques can be used, and that meltblown and spunbonded technology sometimes overlap.

Figure 7B:
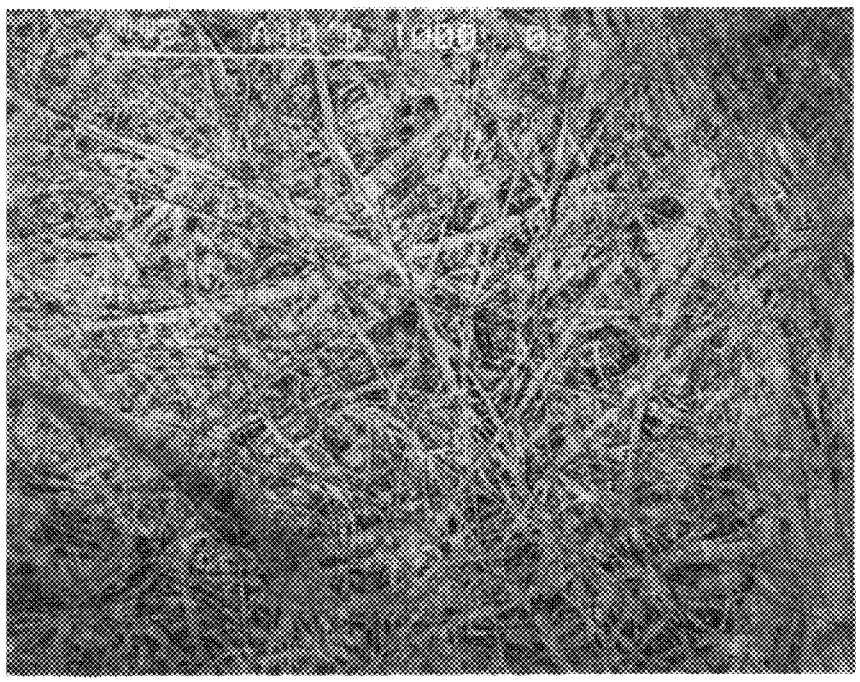
FIG. 7B is an electron micrograph of the present textile laminate of the present invention.

The extruded second fibers 30 are layed onto the fiberfill web substrate 20 under conditions sufficient to mechanically interentangle with the first fibers 21 of the fiberfill web substrate 20. Typically this is accomplished by providing sufficient negative draft under the fiberfill web substrate 20 and by controlling the extruder die to collector (substrate 20) distance. The extruded second fibers tend to dither or whip back and forth on exit of the orifice or spinneret due to air turbulence. This contributes to the tendency of the second fibers to mingle among themselves and to form a web of considerable integrity prior to contact with the fiberfill web substrate 20, and thereafter to penetrate into and have an affinity for the fiberfill substrate and to provide mechanical interentanglement. This mechanical entanglement is illustrated in FIGS. 3 and 4, and the electron micrograph of FIG. 7B. The mechanical interentanglement is comparable to Velcro®-type entanglement in that the different fibers tend to act similar to the hooks and loops of Velcro®. This controlled clinging or adherence can also be used to facilitate bonding of a decorative cover layer to form a textile laminate such as a quilted bedding product. This is contrasted to the prior art, for example, shown in FIG. 7A wherein the fibers similar to fibers 30 are bonded together by thermal calendering to form an integral and separate sheet. It is to be noted that a layer of material such as shown in FIG. 7A will not exhibit the type of mechanical interentanglement exhibited by the face layer of the present invention when laid on or otherwise applied to a fiberfill substrate. In fact, a prior art-type face layer can easily be removed from the fiberfill layer, and there would not be any consolidation of the layers because there is little or no interentanglement of the fibers of each layer.

The extruder die to substrate (collector) distance can be used to control the texture of the fiber stream 31 of the extruded second fibers 30 so that the outer surface of the fiber stream 31 on the textile laminate 10 can be made to have either greater or less tendency to cling to other plies of textile laminate 10, as may occur when textile laminate 10 having only one face layer 35 is stored in a rolled and compressed configuration. Shorter than conventional extruder die to substrate (collector) distance has been found to enhance this polishing or sealing of face layer 35 so that storage in compressed roll form is practicable. Further, the degree of clinging between face layer 35 and supplemental materials such as decorative cover sheets that are applied to textile laminate 10 to make quilted bedding products such as comforters can be controlled in this way.

Albeit even lighter webs of extruded second fibers 30 can be made which are too weak to be handled as separate and independent webs, these webs also contribute desirable properties to the textile laminate 10 when combined in the exemplary manner with a fiberfill web substrate 20.

It is noted that there is some thermal or fusion bonding of the first fibers 21 and the extruded second fibers 30 inasmuch as thermoplastic fibers are often used. Additionally, a face layer 35 and a base layer 36 can be either simultaneously in a single machine operation or in separate lines layed onto the fiberfill web substrate 20. Additionally, the face layer 35 and base layer 36 can be formed from the same or different fibers listed previously.

The textile laminate 10 of the present invention can be used in a variety of embodiments. Generally, the textile laminate 10 is used for its encapsulating properties, its resilient bulk properties or its tensile strength. As shown in FIGS. 5 and 6, the textile laminate 10 can be used in a quilt 37 as the layer providing loft. Outer layers 40a and 40b of quilt material are sewn around the textile laminate. Other examples include bedding (e.g., comforters, bedspreads, sheeting, mattress pads, mattress covers, pillows, pillow shams, lap robes, coverlets, positioning aids, bolsters, blankets, cushions, etc.); apparel (e.g., parkas, vests, lingerie, prostheses etc.); filtration media (e.g., air stream, liquid, reactive fiber substrates, vacuum cleaners, HEPA-type, clean room filters, etc.); insulation (e.g., decorative window insulator blankets, etc.) geotextiles; composite materials (e.g., high loft molding panels for automotive components, etc.) and the like.

EXAMPLE 1

A fiberfill web substrate having a basis weight of 6 oz/sq yd and mode with fibers having an average linear density of 6 denier per filament and an average fiber length of 2 inches is formed from 295-type polyester fiberfill fibers available from Hoechst-Celanese Company, Shelby, N.C. The fiberfill web substrate is moved on a horizontal conveyor at a constant velocity of about 60 feet/minute. A meltblown extruder die is located at a 10 inch die to collector (fiberfill web substrate) distance. Run conditions are established to form a face layer having a basis weight of 5 g/sq m using Exxon Escorene 500 melt flow rate polypropylene fibers. The final average filament diameter is in the range of 2 to 28 micrometer. The turbulent air loft of the web comprising the plurality of extruded second fibers is in the range of 2 to 6 inches. The impact point for the extruded fibers is about 2 inches after blend point for the (horizontal) flat-to-round conveyor transition. The draft rate into the quarter-round collector section is sufficient to impel the web firmly against that surface and allow it to be collapsed to an average thickness of 20 to 40 micrometer. These meltblown second fibers have enough constructional integrity to allow them to be transferred off the collector as a single-ply integral web even in the absence of a fiberfill web substrate, wound into a roll under enough tension to prevent wrinkles, and unwound from the rolled configuration without destroying the integrity of that web.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A textile laminate comprising:
   a fiberfill web substrate having a plurality of first fibers at a surface of the substrate; and
   a face layer on said fiberfill substrate, wherein said face layer is in the form of a web of integrity prior to contacting the fiberfill web substrate and comprises a plurality of extruded second fibers which penetrate and are mechanically interentangled with said plurality of first fibers at the surface of said substrate to thereby form the textile laminate.

2. The textile laminate according to claim 1 wherein the first fibers of the fiberfill substrate are fibers of polyesters, aliphatic and aromatic polyamides, polyolefins, polybenzimidazoles, polyphenylene sulfides, acrylics, cellulose acetate, rayon, cotton, cellulose, ramie, linen, wool, steel, nickel, glass, alone or blends with each other.

3. The textile laminate according to claim 2 wherein said first fibers have a linear density of from about 1 to 30 denier per filament.

4. The textile laminate according to claim 1 wherein the plurality of extruded second fibers comprises fibers of polyesters, polyolefins, polybutylene terephthalate, polyethylene terephthalate, aliphatic and aromatic polyamides, polybenzimidazoles, polyphenylene sulfides, alone or in blends with each other, or as copolymers thereof.

5. The textile laminate according to claim 4 wherein said second fibers have a fiber diameter of from about 2 to 620 micrometer.

6. The textile laminate according to claim 1 wherein the first fibers of the fiberfill web are polyester fibers and the second fibers of the face layer are polypropylene fibers.

7. A textile laminate comprising:
   a face layer and a base layer each comprising a plurality of extruded second fibers; and
   a fiberfill web layer positioned between the face layer and the base layer, the fiberfill web layer having a plurality of first fibers, said extruded second fibers of the face layer and the base layer being mechanically interentangled with the first fibers of the fiberfill web layer to thereby form the textile laminate.

8. The textile laminate according to claim 7 wherein the first fibers of the fiberfill substrate are selected from the group consisting of fibers of polyesters, aliphatic and aromatic polyamides, polyolefins, polybenzimidazoles, polyphenylene sulfides, acrylics, cellulose acetate, rayon, cotton, cellulose, ramie, linen, wool, steel, nickel, glass, alone or blends with each other.

9. The textile laminate according to claim 8 wherein said first fibers have a linear density of from about 1 to 30 denier per filament.

10. The textile laminate according to claim 7 wherein the extruded fibers of the face layer and base layer are formed from fibers selected from the group consisting of fibers of polyesters, polyolefins, polybutylene terephthalate, polyethylene terephthalate, aliphatic and aromatic polyamides, polybenzimidazoles, polyphenylene sulfides, alone or in blends with each other, or as copolymers thereof.

11. The textile laminate according to claim 10 wherein the extruded fibers of the face layer and the extruded fibers of the base layer comprise different thermoplastic resins.

12. The textile laminate according to claim 7 wherein said second fibers have a fiber diameter of from about 2 to 620 micrometer.

13. The textile laminate according to claim 7 wherein the first fibers of the fiberfill web are polyester fibers and the second fibers of the face layer are polypropylene fibers.

* * * * *

UNITED STATES PATENT AND TRADEMARK OFFICE
CERTIFICATE OF CORRECTION

PATENT NO. : 5,925,581

DATED : July 20, 1999

INVENTOR(S) : Tolbert

It is certified that error appears in the above-identified patent and that said Letters Patent is hereby corrected as shown below:

On the title page, [73] Assignee, "Spring Industries, Inc." should read --Springs Industries, Inc.--.

Signed and Sealed this

Twenty-eighth Day of December, 1999

Attest:

Q. TODD DICKINSON

*Attesting Officer*       *Acting Commissioner of Patents and Trademarks*